United States Patent [19]

McRae

[11] 4,242,185
[45] Dec. 30, 1980

[54] PROCESS AND APPARATUS FOR CONTROLLING IMPURITIES AND POLLUTION FROM MEMBRANE CHLOR-ALKALI CELLS

[75] Inventor: Wayne A. McRae, Zurich, Switzerland

[73] Assignee: Ionics Inc., Watertown, Mass.

[21] Appl. No.: 72,543

[22] Filed: Sep. 4, 1979

[51] Int. Cl.³ .......................... C25B 1/34; C25B 9/00
[52] U.S. Cl. ..................................... 204/98; 204/128; 204/195 R; 204/257; 204/258; 204/274
[58] Field of Search ................. 204/98, 128, 257, 258, 204/195 R, 274

[56] References Cited

U.S. PATENT DOCUMENTS

| 3,627,479 | 12/1971 | Yee ........................................ 204/98 |
| 4,116,781 | 9/1978 | Dorio et al. ........................... 204/98 |

*Primary Examiner*—R. L. Andrews
*Attorney, Agent, or Firm*—Norman E. Saliba

[57] ABSTRACT

An improved integrated and cyclic process and apparatus are disclosed wherein portions of various process and waste fluids are recycled to control impurities in the influents to membrane chlor-alkali cells and simultaneously to minimize liquid pollutants from the process. The improved process and apparatus reduces energy costs and wastes while simultaneously controlling impurities important to operation of membrane chlor-alkali electrolytic cells.

10 Claims, 2 Drawing Figures

PROCESS AND APPARATUS FOR CONTROLLING IMPURITIES AND POLLUTION FROM MEMBRANE CHLOR-ALKALI CELLS

BACKGROUND OF THE INVENTION

1. Field of the Invention

The invention resides in the field of electrolytic devices and more particularly relates to chlor-alkali or alkali metal chloride systems utilizing a multiplicity of cells each containing fluid impermeable, permselective perfluorocarbon membranes.

2. Description of the Prior Art

The electrolysis of alkali metal chlorides in a multiplicity of cells each with a cation selective membrane for the production of chlorine and alkali hydroxides is well known, particularly with respect to the conversion of sodium chloride. In the sodium chloride process the electrolysis apparatus typically consists of several cells divided into anolyte and catholyte compartments by permselective cation membranes. Brine is fed to the anolyte compartments and water to the catholyte compartments. A voltage impressed across the cell electrodes causes the migration of sodium ions through the membranes into the cathode compartments where they combine with hydroxide ions formed from splitting of water at the cathodes to form sodium hydroxide (caustic soda). Hydrogen gas is also formed at the cathodes and chlorine and oxygen gases are formed at the anodes.

The efficiency of these cells for production of caustic and chlorine depends upon how they are operated, that is, the balancing of the chemical parameters of the cell, the process liquids and further how the cells are constructed, that is, what materials are used to form the components. Maximizing the efficiency generally results in the production of noxious liquid wastes. The cation permselective fluorocarbon membranes which separate the anode compartments from the cathode compartments are fluid impermeable and effectively prevent bulk flow of brine into the caustic in the cathode compartment, of hydrogen into the chlorine in the anode compartment and of chlorine into the hydrogen in the cathode compartment. They usually contain carboxylate, sulfonate and/or sulfonamide active groups. They suffer the disadvantages of all cation selective membranes in chlor-alkali cells, that is, while highly selective to monovalent cations (as compared to anions) they permit the passage of non-monovalent cations from the anode compartment to the cathode compartment and of some hydroxide anions from the cathode compartment to the anode compartment. The encounter of the flux of non-monovalent cations with the flux of hydroxide anions results in the precipitation within the cation selective membrane of the insoluble hydroxides of some non-monovalent cations, including for example, magnesium, calcium, strontium, barium and iron. These precipitates increase the electrical resistance of the membranes and if allowed to build up decrease the efficiency of the membrane for transport of monovalent cations and may eventually destroy the physical integrity of the membrane. It has been proposed in U.S. Pat. No. 3,793,163 to mitigate such precipitation by adding phosphate to the brine influent to the anode compartments. A few hundred parts per million of phosphate are typically used and for example result in the formation in the anode compartments of an isoluble gel precipitate containing calcium and phosphate. Such phosphate addition does appear to reduce the rate of precipitation of calcium hydroxide inside the cation selective membrane. An excess of phosphate must be used compared to the amount of calcium present and if not carefully controlled may have deleterious effects on the over potential and life of the ruthenium oxide type catalytic anodes frequently used in membrane chloralkali cells. Such phosphate also constitutes an undesirable secondary feed which must be carefully controlled and adjusted to the rate of brine feed to the anode compartments.

Non-monovalent metallic cations in the water fed to the cathode compartments can also lead to the precipitation of insoluble hydroxides in the cathode compartments. The concentration of such cations should preferably also be controlled, typically by softening with cation exchangers. The exchangers must be regenerated and the spent regenerant constitutes a pollution problem.

It has been mentioned above that the cation selective membranes in chlor-alkali cells permit the passage of some hydroxide anions from the cathode compartment to the anode compartment. In fact from about 5 to as much as 40 percent of the electric current can be carried by such hydroxide anions depending both upon the characteristics of the membrane and the concentration of hydroxide in the cathode compartments. Such hydroxide entering the anode compartments can result in a decrease of chlorine production efficiency at the anode through the increase in the direct evolution of oxygen at the anode and the reaction of chlorine with hydroxide to form hypochlorite and chlorate. If the liquid effluent from the anode compartments is resaturated with chloride and recycled to the process, then such chlorate may build up and limit the solubility of chloride in the influent to the anode compartments. Chlorate has been typically controlled by sending to waste part of the effluent from the anode compartments and recycling the remainder. Such "bleeding" to waste constitutes a pollution problem and a loss of chloride. On the other hand the hypochlorite and chlorine content of that portion which is recycled poses a corrosion problem for the chloride resaturation apparatus and the subsequent brine treatment equipment. Adding acid to the anolyte compartment neutralizes some of the hydroxide anions and decreases the build up of chlorate and the evolution of oxygen. Such procedure has been described in U.S. Pat. No. 3,948,737, Cook, Jr. et al and elsewhere.

Finally, most commercially available chloride salts contain appreciable quantities of sulfate. If the effluent from the anode compartments is recycled and resaturated then sulfate may build up in the influent to the anode compartments decreasing chloride solubility and increasing oxygen evolution at the anodes. It is conventional in non-membrane electrolytic chlor-alkali processes in which brine is recycled to control sulfate by adding soluble barium salts thereby precipitating insoluble barium sulfate. However at the extreme alkalinities existing in the interior of cation selective membranes in chlor-alkali cells, the residual soluble barium may precipitate in the interior of the membrane, resulting in increase in energy consumption and eventually in possible destruction of the physical integrity of the membrane as discussed above. Typically therefore the sulfate content in the influent to the anode compartments in recycle systems has been controlled by bleeding to waste a portion of the effluent from the anode compartments and resaturating and recycling the remainder.

Thus the typical membrane chlor-alkali plant has a number of liquid and gaseous wastes which may constitute pollution and economic problems; and requires a number of chemical feeds to prevent increases in the energy consumption per unit of available chlorine produced.

The present invention comprises an improvement over the above discussed prior art techniques particularly as applied to large volume production membrane chlor-alkali cell apparatus where conservation of energy and utilization of process products and raw materials are important considerations in the economic feasibility of such plants. In the method of this invention, this is accomplished by arranging the process steps in a membrane chlor-alkali plant in particular preferred arrangements with respect to each other and by using as process streams various recycle streams. In one preferred embodiment there are no liquid or gaseous wastes from the membrane chlor-alkali plant and simultaneously no increase in energy consumption per unit of chlorine produced from the build up of precipitates in the membranes or from the build up of chlorate and/or sulfate in the recirculated effluent from the anode compartments.

SUMMARY OF THE INVENTION

The invention may be summarized as an improved method and apparatus for controlling and maintaining the concentration of various impurities in the influents to membrane type chlor-alkali electrolysis cells having an anolyte which is recirculated at least in part, particularly such cells suited for converting sodium chloride or brine to sodium hydroxide or caustic, while simultaneously minimizing the amount of liquid and gaseous waste products, (in one preferred embodiment substantially eliminating such wastes) and reducing the energy comsumption per unit of chlorine produced. This is accomplished by arranging the process steps and apparatus in particular preferred arrangements with respect to each other and by using as process streams various recycle streams. Fundamentally the steps are as follows.

(a) The recycle brine, purified as described below, together with additional process water, is saturated with chloride salt and mixed with at least one compound selected from the group consisting of phosphoric acid, alkali carbonates, alkali bicarbonates, alkali phosphates and alkali acid phosphates. The mixture is adjusted to a pH of at least about 10 by adding part of the effluent from the cathode compartments of the membrane chlor-alkali cells whereupon part of the non-monovalent cations in the brine are precipitated. Preferable the amount of compound added is sufficient to precipitate a major portion of such non-monovalent cations. The thus pretreated brine is recovered by means well known in the art, such as settling, filtration and the like. A portion of this clarified brine, preferably after adjusting the ph to less than 10 with some of the hydrochloric acid produced as discussed below, is used to regenerate a cation exchanger to the substantially monovalent cation form. The spent regenerant is returned to the pretreatment step. The cation exchanger in the monovalent cation form is used to remove non-monovalent cations from at least part of the water fed to the cathode compartments of the membrane chlor-alkali cells. In this way impurities are removed from both the anolyte feed and the catholyte feed, producing only easily disposed of solid waste products.

Optionally a water soluble barium compound such as barium chloride or barium hydroxide is added after one or more of the above listed compounds are added to control the sulfate to a level of less than about 15 grams per liter. The amount of soluble barium compound added should be sufficient to reduce the sulfate to less than 15 grams per liter but is preferably not more than that equivalent to the amount of sulfate present. (b) The recycle brine, partially purified of non-monovalent cations and optionally of sulfate as described above may be used in conventional membrane chlor-alkali cells but it will be found that the electrical conductivity and current efficiency of the membranes decrease rapidly with time requiring frequent regeneration of the membranes. Alternatively a few hundred parts per million of phosphate may be added to the brine influent to the anode compartments. Both of these alternatives have many disadvantages as described above. According to the instant process the brine, pretreated as in the previous step is contacted with a chelating cation exchanger to reduce and maintain the concentration of any non-monovalent cation to less than about 2 parts per million. One preferred general chelating cation exchanger is a granular cation exchange resin containing iminodiacetic acid groups

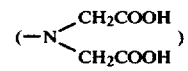

such as that supplied by Rohm and Haas Co. as Amberlite ®IRC-718, that supplied by Dow Chemical Co. as Dowex ®A1 or that supplied by Mitsubishi Chemical Co. (Japan) as "Diaion ®CR10". In this case the chelating cation exchanger should be in the monovalent cation form and the brine should have a pH of at least about 9. When this chelating cation exchanger is exhausted, as shown by its loss of ability to reduce the concentration of any non-monovalent metallic cation to less than about 2 ppm it is regenerated by contacting it with some of the hydrochloric acid solution obtained as described below. The spent hydrochloric acid solution is preferably added to the liquid effluent from the anode compartments to assist in controlling the pH to less than or equal to about 2 prior to dechlorination as described below. Such recycle conserves acid and eliminates a liquid waste pollution problem. The non-monovalent cations in such spent regeneration acid are returned with the dechlorinated, depleted brine to the pretreatment step where they are removed as insoluble precipitates. The chloride values in the spent regenerative acid are thus also returned to the process. Following acid regeneration, the chelating cation exchanger is contacted with some of the effluent from the cathode compartments to return it to the sodium form. Preferable the chelating cation exchanger when used in granular form is utilized in the form of conventional ion exchange beds, columns or tanks. Conventional counter flow exhaustion and regeneration may be used. Alternatively the granular chelating cation exchanger may be used in continuous or semi-continuous contacters well known in the art.

A second preferred general chelating cation exchanger is a liquid cation exchanger consisting of diethyl hexyl phosphoric acid and tributyl phosphate and/or isodecanol in a water insoluble organic solvent such as kerosene. Typically the diethyl hexyl phosphoric acid is present at a concentration of about 5 percent and the tributyl phosphate or isodecanol at a somewhat lower concentration, e.g. about 2.5 percent. As above, the cation exchanger is regenerated with acid and the spent acid regenerant, preferably after treatment with activated carbon to remove residual organics, is preferably added to the liquid effluent from the anode compartments as described above. Preferably the brine which has been treated with the liquid chelating cation exchanger is also treated with activated carbon to remove residual organics before passing to the anode compartments of the membrane chlor-alkali cells. The liquid chelating cation exchange may be carried out in conventional contactors such as mixer-settlers. Typically two or more contacting stages may be required to insure that the concentration of each non-monovalent cation is less than about 2 ppm. Preferably extraction and regeneration take place countercurrently.

It will be understood that other general chelating cation exchangers may be used, the only requirement being that such exchangers should have a high selectivity for most of the non-monovalent metallic cations present in the brine. Specific chelating cation exchangers which are highly selective toward a single cation are not preferred.

By the use of this step, remaining non-monovalent cations are reduced to low levels enabling comparatively stable electrical energy consumption to be maintained in the membrane chlor-alkali cell, regeneration acid is conserved and a liquid waste pollution problem avoided. As described above the non-monovalent cations in such spent regeneration acid are returned with the dechlorinated, depleted recycle brine to the pretreatment step where they are removed as insoluble precipitates. The chloride values in the spent regeneration acid are also returned to the process in this way.

(c) As pointed out above, according to this invention, a cation exchanger in the monovalent cation form is preferably used to remove non-monovalent cations from at least part of the water fed to the cathode compartments of the membrane chlor-alkali cells. Optionally such water may be substantially demineralized by contacting with a cation exchanger in the hydrogen form and an anion exchanger in the hydroxide form. Demineralization by ion exchange is well known in the art. In this case the anion exchanger is regenerated by some of the effluent from the cathode compartments of the membrane chlor-alkali cells and the spent regenerant, containing some free alkali is preferably recycled to the brine precipitation step to conserve alkali and eliminate a liquid waste pollution problem. The cation exchanger is regenerated with some of the hydrochloric acid solution obtained as described below and the spent regenerant, containing some free acid is preferably added to the liquid effluent from the anode compartments to assist in controlling the pH prior to dechlorination also as described below. Such recycle conserves acid and eliminates a liquid waste pollution problem. The non-monovalent cations in such spent regeneration acid are thus returned with the dechlorinated, depleted brine to the pretreatment step where they are removed as insoluble precipitates. The monovalent cations and chloride values in the spent regeneration acid are also returned to the process.

The brine after treatment by the chelating cation exchanger as discussed above may be sent directly to the anode compartments of the membrane chlor-alkali cells. However chlorate will inevitably build up in the brine from inefficiencies at the anodes and from hydroxide penetrating the membranes from the cathode compartments to the anode compartments if all or substantially all of the effluent from the anode compartments is recycled for resaturation and reuse. Substantial amounts of chlorate will limit the solubility of chloride salts in the brine and the combination of decreased chloride and increased chlorate will result in decreased efficiency for chlorine evolution at the anodes and increases in electrical energy consumption. It is found that such effects become significant when the amount of chlorate in the brine exceeds about 25 grams per liter and it is therefore desirable to control the concentration to values less than such amount. Conventionally this is accomplished by recycling for resaturation, only part of the effluent from the anode compartments so that after resaturation and mixing with fresh brine the chlorate of the mixture is less than about 25 grams per liter. The remainder of the effluent is sent to waste thus contituting a loss of chloride and a liquid waste pollution problem particularly because of the chlorate content. It has been found that the chlorine efficiency of the anodes may be increased and the electrical energy consumption per unit of chlorine decreased if the pH of the liquid immediately effluent from the anode compartment is controlled to be in the range of about 2 to about 4 and if the conversion in the cell of the chloride in the influent to the anode compartments is controlled to be not more than about 60 percent and if the temperature of the liquid immediately effluent from the cathode compartment is controlled to be in the range of from about 70° C. to about 95° C. It will be understood that since some water will be transferred through the cation selective membranes from the anode compartments to the cathode compartments the percentage decrease of chloride concentration in the effluent from the anode compartments (as compared to the influent) will be less than the percentage conversion of chloride mass. The pH of the effluent is preferably controlled by the controlled addition of some of the hydrochloric acid solution obtained as described below or by the addition of a suitable waste or recycled hydrochloric acid solution as discussed more fully below also. Limiting conversion of chloride to less than about 60 percent coupled with controlling the pH of the effluent to the range of from about 2 to about 4 and with maintaining the liquid immediately effluent from the cathode compartments at a temperature in the range of from about 70° C. to about 95° C. will substantially decrease but not completely eliminate the formation of chlorate which will eventually build up to a concentration of 25 grams per liter or more if substantially all of the liquid effluent from the anode compartments is recycled. Therefore, preferably, in accordance with this invention, the pH of part of the brine effluent from the chelating cation exchanger (as described above) is acidified with some of the hydrochloric acid solution obtained as described below and heated to convert chlorate to chlorine in accordance with the equation:

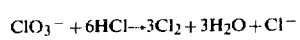

$$ClO_3^- + 6HCl \rightarrow 3Cl_2 + 3H_2O + Cl^-$$

Typically the pH should be about 1 and the temperature about 90° C. Chlorine dioxide may also form and should not be allowed to approach an explosive concentration in the gas space over the brine, for example by diluting the gas with steam, air, nitrogen or the recycled gaseous effluent from the hydrochloric acid absorber described below. The chlorine recovered may be combined with the gaseous effluent from the cathode compartments to produce at least part of the hydrochloric acid solution described below or may be absorbed in some of the liquid effluent from the cathode compartment. Said liquid effluent should preferably be at least equivalent to the chlorine chemically and should be maintained at a temperature of less than about 30° C. thereby producing an aqueous solution containing hypochlorite.

The fraction of the brine processed in this manner and the extent of conversion of chlorate are preferably mutually controlled so that when the thus processed brine is added to the remainder of the brine (not processed) the chlorate concentration in the combined brine will be less than about 25 grams per liter. The residual hydrochloric acid in the processed brine will assist in controlling the pH of the effluent from the anode compartments as described above.

(d) The effluent from the anode compartments of the membrane chlor alkali cells is separated in conventional gas liquid separators into a gaseous fraction containing primarily chlorine, water vapor, oxygen, small amounts of carbon dioxide (from decomposition of carbonates and/or bicarbonates in the brine influent to the anode compartments), nitrogen and hydrogen; and into a liquid fraction containing chloride, hypochlorite, chlorate and chlorine as well as other dissolved substances. The liquid fraction if sent to waste would constitute a pollution problem and a waste of chloride values. At least part of it is therefore preferably recycled, after resaturation with chloride to the brine precipitation step outlined above. The dissolved chlorine and hypochlorite present a corrosion burden on the resaturation, precipitation, and chelating cation exchange apparatus as well as loss of valuable available chlorine. The liquid fraction is therefore preferably adjusted (without cooling) to a pH of less than or equal to about 2 with some of the hydrochloric acid solution obtained as discussed below and intimately contacted with at least one volume of air to produce chlorine containing air and a low chlorine liquid fraction. The contact is preferably made in a conventional packed tower with ceramic packing though a closed tank with an air sparge is entirely satisfactory. The chlorine-containing-air is contacted with some of the liquid effluent from the cathode compartments at least equivalent chemically to the chlorine in the air at a temperature of less than about 30° C. thereby producing an aqueous solution containing hypochlorite. At least part of the low chlorine liquid fraction is resaturated with chloride salt and returned to the above described precipitation step with or without destroying residual chlorine, if any, with one or more compounds selected from the group consisting of sulfur dioxide, sulfites, bisulfites, phosphites, acid phosphites, phosphorous acid or hypophosphites or by contacting the liquid fraction with activated carbon or activated charcoal.

(e) The effluent from the cathode compartments of the membrane chlor-alkali cells is separated in conventional gas-liquid separators into a gaseous fraction containing primarily hydrogen and water vapor and into a liquid fraction containing primarily hydroxides of monovalent cations but also small amounts of chloride and other substances. The gas-liquid separators and associated fluid conduits for the effluents from both the anode compartments and the cathode compartments are preferably arranged and constructed to maintain the absolute pressure of the gas at the exit from the anode compartments in the cells substantially above that of the gas at the exit from the cathode compartments. Such a pressure differential will insure that any loss of physical integrity of any membrane will result in gas from the adjacent anode compartment flowing into the adjacent cathode where it can be rendered innocuous by absorption by hydroxide to form hypochlorite and chlorate. If the pressure differential were reversed gas from the adjacent cathode compartment could flow into the adjacent anode compartment combining violently with the chlorine and oxygen gas therein.

Some of the separated gas from the cathode compartment effluent is combined with an equivalent amount of the separated gas from the anode compartment effluent and with water to produce a hydrochloric acid solution. Suitable reactors, such as hydrogen-chlorine burners are commerically available and well known in the art. Typically the hydrogen and chlorine are burned and absorbed countercurrently in water in apparatus constructed of massive carbon at critical points subject to corrosion. At least part of the hydrochloric acid solution is recovered for the internal use described herein. If a substantial fraction of the chlorine which is recovered from the anode effluent gas-liquid separator is to be liquefied then it is preferable to obtain the chlorine which is to be combined with hydrogen, according to this invention, at least in part from another step in the overall process namely after partial chlorine liquefaction. Such liquefaction may be carried out in conventional, commerically available apparatus consisting for example of a cooler to condense out an appreciable fraction of the water vapor in the gaseous effluent from the anode compartments; a countercurrent drier using approximately 66° Baume (98%) sulfuric acid as the drying agent; a compressor; and a second cooler to liquefy at least part of the compressed chlorine. As the compressed chlorine liquefies, its vapor pressure in the gas phase becomes less because of dilution by the oxygen, carbon dioxide and nitrogen present in the gaseous effluent from the anode compartments. To obtain substantially all of the chlorine in liquid form requires alternatively or in combination low temperatures in the cooler (but above the dew point of any residual water vapor); high pressures in the compressor; or a second stage of compression and cooling. According to this invention it is proposed to liquefy only that chlorine not required for conversion to hydrochloric acid solution for internal use in the chlor-alkali process as described above, the remaining chlorine and oxygen being combined (also as described above) with a substantially equivalent amount of the gaseous effluent from the cathode compartments and with water to form aqueous hydrochloric acid solution.

DESCRIPTION OF THE PREFERRED EMBODIMENTS

Figure 1:
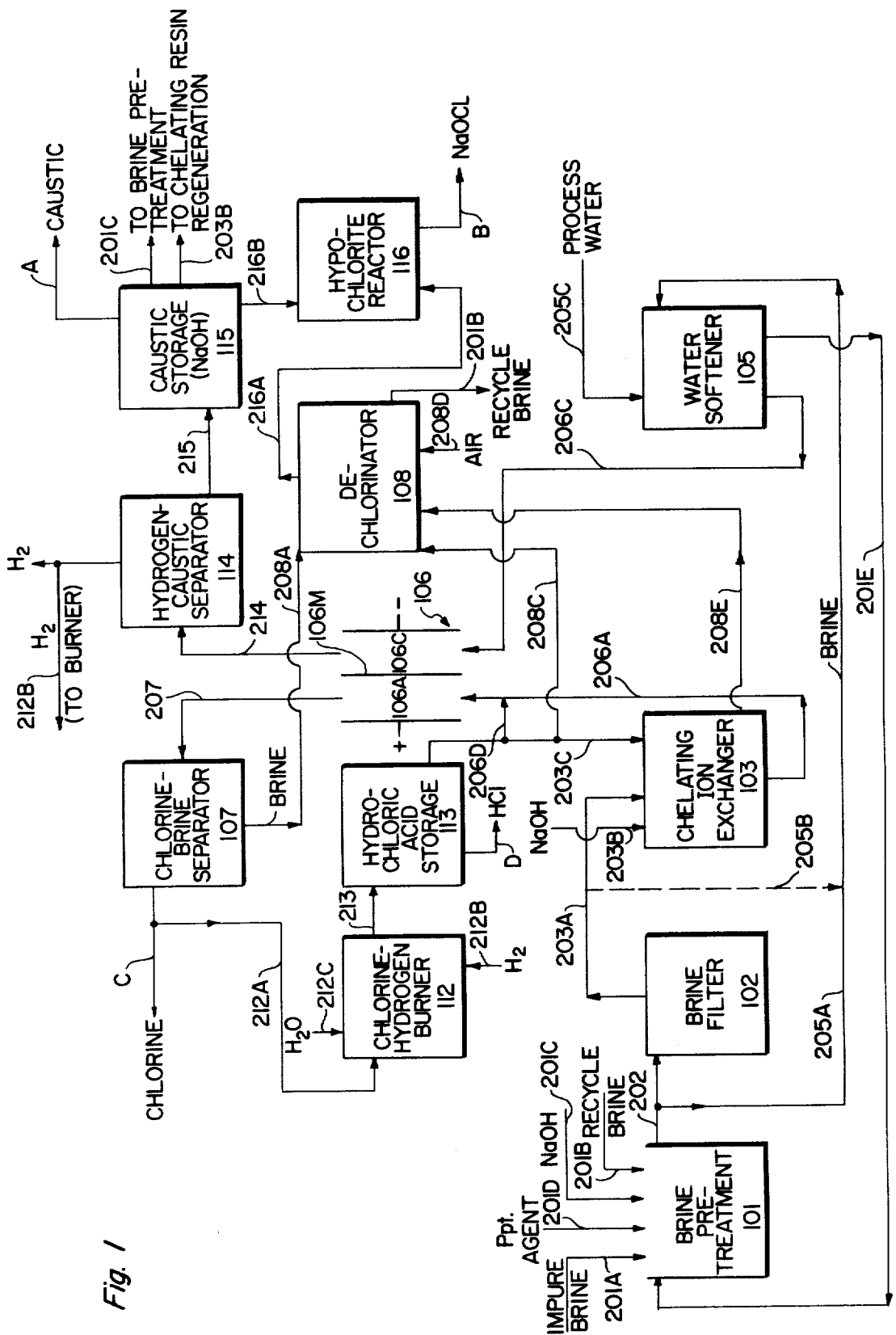
FIGS. 1 and 2 are schmatic representations of preferred embodiments of the invention, showing various preferred methods of operation.

Referring to FIG. 1, there is shown a schematic representation of a preferred multiple cell, membrane chlor alkali system suitable for practice of the invention. The system comprises a brine treatment vessel 101 into which pass impure, substantially saturated chloride brine make-up through conduit 201A and substantially resaturated recycle brine through conduit 201B. The brine make-up will generally contain sufficient chloride to make-up for chloride used in the electrolytic cell 106 and lost elsewhere in the system. Frequently the brine make-up and resaturated recycle brine will enter the brine treatment vessel through the same conduit but separate conduits are shown for the sake of clarity. A controlled amount of a precipitating agent for non-monovalent metallic cations is added with mixing to vessel 101 through conduit 201D. Such agent is preferably one or more compounds selected from the group consisting of phosphoric acid, the soluble carbonates, bicarbonates, phosphates and acid phosphates of monovalent alkali metal cations. The pH of the contents of vessel 101 is adjusted to at least 10 by adding with mixing through conduit 201C a controlled amount of the effluent from the cathode compartments 106C of the multiplicity of membrane electrolysis cells 106. Such additions through conduits 201C and 201D are controlled to result in the precipitation of a major fraction of most non-monovalent metallic cations in the contents of vessel 101. For example, barium, strontium and calcium are precipitated as the carbonates or phosphates, magnesium as the hydroxide, iron as the hydroxide or phosphate. The precipitating agent added through conduit 201D and the cathode compartment effluent added through conduit 201C should both be controlled to be substantially in excess of the amounts incorporated in such precipitates. The thus treated brine having a major fraction of non-monovalent cations removed is preferably decanted from the precipitate through conduit 202 and further clarified, for example, in filter 102 which may be, for example, a sand filter or a precoat filter. The selection of filter 102 depends on the state of subdivision of residual suspended precipitate in the decanted brine. If the decanted brine is relatively clear then a portion passes intermittently through conduit 205A to regenerate water softener 105. Alternatively a portion of the effluent from filter 102 passes through conduit 205B to regenerate the softener.

The brine effluent from filter 102 through conduit 203A generally contains residual non-monovalent cations. It may be sent directly to the anode compartments of the membrane cells but it will generally be found that the voltage of the cells at constant current density will increase at an uneconomical rate owing, apparently, to the precipitation of insoluble hydroxides of non-monovalent cations within the membranes, all as discussed above. Preferably, therefore the remaining brine (that is, the brine not used to regenerate the water softener) passes through conduit 203B and is contacted with a chelating cation exchanger in vessel 103. The chelating cation exchanger is preferably selected from the group consisting of granular cation exchangers containing iminodiacetate groups or liquid cation exchangers containing dialkyl phosphoric acid groups as discussed above. (It is preferred that the organic phosphoric acid have from about 12 to about 20 carbon atoms.) For the sake of clarity vessel 103 is shown as a single vessel but may in fact consist of several cooperating vessels arranged in hydraulic series and/or parallel. This will generally be the case for the liquid chelating cation exchangers. The contact of the brine with the chelating cation exchangers is controlled to give an effluent brine (through conduit 206A) containing not more than about 2 ppm of any non-monovalent cation. Eventually the capacity of the cation exchanger to give such an effluent will be exhausted whereupon it is regenerated with hydrochloric acid solution entering through conduit 203C, the hydrochloric acid solution having been obtained as discussed above by combining part of the gaseous effluent from the anode compartments of the membrane cells with part of the gaseous effluent from the cathode compartments. Typically such regeneration acid has a concentration of about 1 gram equivalent per liter and is used in excess to obtain substantial regeneration of the chelating cation exchangers. The spent regeneration acid will contain relatively high concentrations of non-monovalent cations as well as residual hydrochloric acid and may be sent to waste. In one embodiment of this invention the spent regeneration acid is sent to the dechlorinator vessel 108 by conduit 208E. In this way the residual acid and chloride values are recycled to the process and a pollution problem is avoided. The non-monovalent cations in the spent regeneration acid will eventually flow back to the brine treatment vessel 101 and there be removed as insoluble precipitates. Generally the quantity of non-monovalent cations removed in cation exchanger 103 is small compared to the quantity removed in vessel 101 and there is only a small burden on the precipitation step from recycling the spent regeneration acid from vessel 103. After regeneration, the chelating cation exchanger is preferably converted to the monovalent cation form by contacting with part of the liquid effluent from the cathode compartments of the membrane cells through conduit 203D. Generally a substantial excess of such effluent is not required. However any excess is preferably recycled to brine treatment vessel 101 or to the cathode compartments by a conduits not shown.

The purified brine passes from vessel 103 to the anode compartments 106A of the membrane cells 106 through conduit 206A. The electrical current density therein is preferably controlled to be in the range of from about 15 to about 36 amperes per square decimeter of membrane exposed to the anode compartment. The flow of brine through the anode compartments is controlled so that not more than about 60 percent of the chloride content thereof is converted to chlorine and by products such as hypochlorite and chlorate. The pH of the brine immediately effluent from the anode compartments is controlled to be in the range of about 2 to about 4, for example, by controlling the addition of hydrochloric acid to the brine through conduit 206D, such hydrochloric acid solution having been obtained as discussed above by combining part of the gaseous effluent from the anode compartments with some of the gaseous effluent from the cathode compartments. It is found that by such control of the pH of the effluent from the anode compartments; of the utilization of the chloride content of the brine and of the current density, the efficiency of chlorine evolution from the anodes will be increased and the energy consumption per unit of chlorine reduced.

The membrane electrolytic cell apparatus, according to this invention comprises a multiplicity of cells, typically five or more, each having an anode compartment containing an anode, a cathode compartment containing a cathode and a substantially fluid impermeable, cation permselective, perfluorocarbon membrane 106M separating the anode compartment from the cathode compartment. The anode preferably comprises an expanded, woven or perforated metal structure of titanium or titanium alloy having a coating capable of generating chlorine containing minor amounts of oxygen from aqueous chloride solutions having at least one gram equivalent of free chloride per liter of solution and a pH in the range of about 0.5 to about 5. Examples of such coatings are: platinum; mixtures of iridium oxide and platinum metal; ruthenium oxide; mixtures of ruthenium oxide and titanium dioxide; monovalent metal cation platinates in which the monovalent cation is present in substoichiometric amounts; palladium oxide and titanium dioxide; cobalti-cobaltous oxide; cobalti-cobaltous oxide mixed with titanium dioxide; zinc colbaltate; and zinc cobaltate mixed with titanium dioxide. The metal oxides are preferably in a finely divided form and have a high surface area. The perfluoro carbon permselective membranes preferably contain carboxylic, sulfonic or sulfonamide active groups or mixtures thereof. Preferably they have a hyperselective skin facing the cathode compartment such skin having less than about 200 grams of absorbed water per gram equivalent of active groups when in equilibrium with a solution containing 2 gram equivalents of alkali metal hydroxide per liter.

The cathodes preferably comprise expanded or perforated carbon steel sheet or woven and calendered carbon steel wire mesh which may be nickel plated and/or coated with high surface area nickel or cobalt metal to reduce hydrogen overvoltage. The gap between the electrodes and the membranes may range from zero (that is one or both of the electrodes may be in contact with the membrane) to as much as 5 millimeters, 0 to 3 millimeters being the preferred range. If both electrodes are not in contact with the membrane then it should be reinforced with an open fabric, resistant to cell operating conditions, which is bonded to one surface or buried in the interior of the membrane. If either or both electrodes are in contact with the membrane then that electrode should preferably have a finely textured structure that is at least 50 percent voids with each opening having a characteristic dimension in the range of about 1 to about 2 millimeters. (The characteristic dimension is defined as four times the ratio of the area of the opening to its perimeter.) In this case the active coating should be on the side of the electrode opposite (that is, away from) the membrane or at least part of the active coating should be detached from the electrode and bonded to and partially buried in the surface of the membrane. Such finely textured electrode may be supported by and in contact with with a less finely textured pre-electrode to provide mechanical support and collect or distribute the electric current. Such pre-electrode typically has substantially more than 50 percent voids with each opening having a characteristic dimension in excess of about 2 millimeters and preferably in the range of about 3 to 10 millimeters. If the gap between an electrode and the membrane is more than 0 and less than about 3 millimeters then the active coatings are preferably on the reverse side of the electrodes, (that is the side away from the membrane). In a preferred arrangement the cathode gap is zero, the anode gap is about 2 millimeters and the fabric reinforced membrane is forced against the cathode by controlled excess of chlorine gas pressure in the anode compartments over hydrogen gas pressure in the cathode compartments.

Process water passes through conduit 205C into contact with cation exchange granules in the alkali metal ion form in vessel 105, wherein non-monovalent cations in the water are exchanged for alkali metal ions. The contact time in vessel 105 should be controlled so that the concentration of any non-monovalent cation is less than about 20 milligrams per liter in the effluent from vessel 105. It will be understood that vessel 105 is typically an unstirred cylindrical tank. The treated, softened effluent from vessel 105 passes through conduit 206C to the cathode compartments 106C of the membrane cells 106 at a rate controlled to maintain the liquid immediately effluent from the cathode compartments at a concentration of at least 8 percent alkali metal hydroxide by weight but not more than about 30 percent by weight. Such immediate liquid effluent is maintained at a temperature of at least about 70° C. and preferably not more than about 95° C. for example by recirculation through a heat exchanger or flash evaporator not shown. It is found that if the liquid immediately effluent from the cathode compartments is controlled to have a concentration of at least 8 percent but preferably not more than about 30 percent by weight and to have a temperature of at least about 70° C. but preferably not more than about 95° C. then the electrical energy consumption per unit of chlorine will be substantially less compared to operation outside the preferred ranges.

The effluent from the cathode compartments 106C passes by conduit 214 to hydrogen-caustic gas-liquid separator 114, typically a vessel having a high area of gas-liquid interface. The substantially hydrogen free caustic passes by conduit 215 to caustic storage vessel 115 from which product caustic passes through conduit A. Caustic for internal uses passes through conduit 201C (for brine pretreatment as discussed above); through conduit 203B (for regeneration of the chelating cation exchanger as discussed above); through conduit 216B (for absorption of chlorine from dilute gas streams as discussed below).

The effluent from the anode compartments 106A passes by conduit 207 to chlorine-spent brine gas-liquid separator 107, typically a vessel having a high area of gas-liquid interface. At least part of the spent brine, substantially free of suspended chlorine bubbles but containing dissolved chlorine, hypochlorous acid and hypochlorite is recylced, after regeneration with alkali metal salt to brine pretreatment vessel 101. The presence of free chlorine, hypochlorous acid and hypochlorite, however, puts a severe corrosion stress on the materials of construction of the resaturator (not shown), brine pretreatment vessel, chelating cation exchanger and their associated piping and controls. This corrosion stress may be handled in part by using generally expensive corrosion resistant materials such as titanium. According to the present invention it is preferred to send the spent brine through conduit 208A to dechlorinator vessel 108 in which the pH is adjusted to less than or about 2 (by addition via conduit 208C of hydrochloric acid solution generated in the system) and the brine is intimately contacted with at least an equal volume of air. Vessel 108 is typically a tower containing acid resistant packing such as Raschig rings or Berl saddles of acid resistant ceramic. The acidified spent brine is trickled down the tower against an upwardly flowing stream of air via conduit 208D. The hypochlorite and hypochlorous acid are converted to chlorine which with the previously existing residual dissolved chlorine is stripped out by the air. The chlorine containing air passes through conduit 216 A to hypochlorite reactor 116 in which the chlorine is absorbed in an excess of hydroxide supplied from vessel 115 by conduit 216B. Product hypochlorite is obtained through conduit B.

Substantially dechlorinated brine passes out of vessel 108 through conduit 201B and after resaturation (not shown) to the brine pretreatment vessel 101. Chlorate and sulfate in the recycle brine are controlled in this embodiment of the invention by bleeding to waste part of the recycle brine before resaturation, the amount bled being controlled to result in a brine influent to the anode compartments 106A having less than about 25 grams per liter each of sulfate and chlorate. It is found that maintaining such concentrations results in increased chlorine evolution efficiency from the anodes and decreased electrical energy consumption per unit of chlorine compared with operations outside the preferred limits.

The gas phase from gas-liquid separator 107 contains chlorine, oxygen and water vapor with small amounts of carbon dioxide, nitrogen and hydrogen and is one of the products of the system, being removed through conduit C. A portion of such gas phase passes through conduit 212A to chlorine-hydrogen burner 112 in which it is combined with substantially a chemically equivalent amount of the gas phase from gas-liquid separator 114 through conduit 212B and with water (through conduit 212C) to produce hydrochloric acid solution at least substantially equal to the acid needs of the system. The hydrochloric acid solution passes through conduit 213 to storage in vessel 113. Internal uses are withdrawn through conduits 203C, 206D and 208C, the remainder being withdrawn as a product of the system through conduit D.

The system described has a high efficiency for chlorine evolution at the anodes, low electric energy consumption per unit of chlorine, minimal liquid wastes, minimum requirements for exogenous chemicals and stable operation of the membrane chlor-alkali cells.

Figure 2:
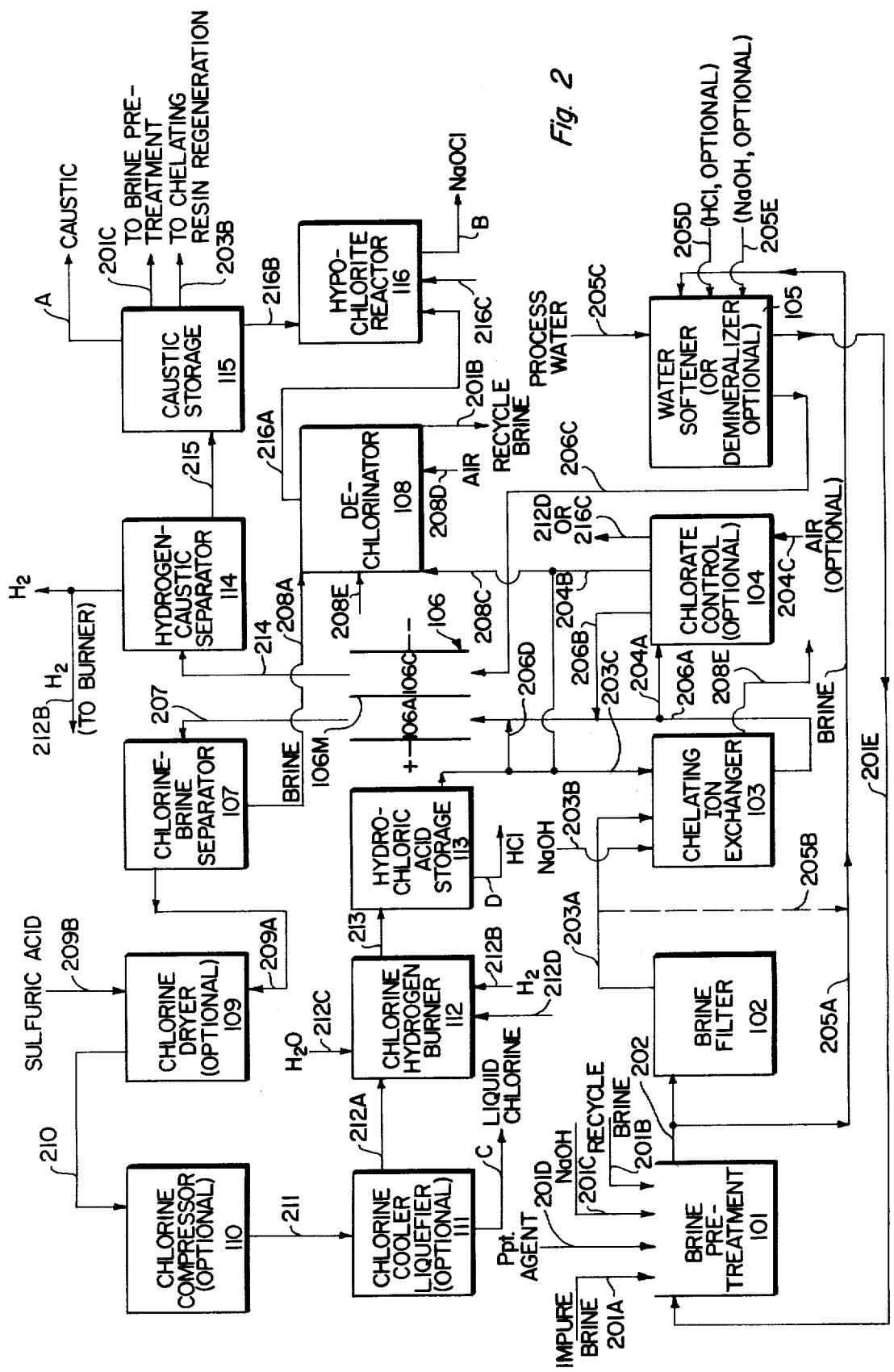

A second preferred multiple cell, membrane chlor-alkali system suitable for practice of the invention is represented schematically in FIG. 2. Steps and apparatus common to the systems of both FIGS. 1 and 2 are identically numbered. The added steps and apparatus are described below. The system of FIG. 2 substantially eliminates the production of liquid wastes and in addition illustrates the coupling of the process and apparatus of the invention with chlorine liquefaction.

Referring to FIG. 2, part of the brine effluent from chelating cation exchanger 103 through conduit 206A is sent through conduit 204A to the optional chlorate control vessel 104 in which chlorate is reacted with some of the hydrochloric acid solution (through conduit 204B) at low pH and an elevated temperature as described above. Vessel 104 is typically a tower packed with acid resistant Raschig rings or Berl saddles. The liquid effluent through conduit 206B joins the remainder of the treated brine and is sent to the anode compartments 106A. The residual acid in the effluent assists in controlling the pH of the liquid effluent from the anode compartments as discussed above. The gaseous effluent, comprising chlorine and water vapor perhaps diluted with air may be sent to hypochlorite reactor 116 or chlorine-hydrogen burner 112 depending on product needs and the composition of the gas. The process in vessel 104 has been described above. The amount of brine processed and the extent of chlorate removal are controlled to produce in the brine system influent to the anode compartments a concentration of chlorate of not more than about 25 grams per liter. The need for blowdown of some recycled brine to control chlorate is thereby eliminated. Blow down to control sulfate may be eliminated as discussed above by adding a soluble barium compound to vessel 101 after the precipitation of non-monovalent cations, the amount of such barium compound preferably being controlled to reduce sulfate to less than about 25 grams per liter but to be not more than chemically equivalent to the amount of sulfate present in such brine.

When a substantial quantity of liquid chlorine is desired as a product of the system, the optional steps carried out in vessels 109, 110 and 111 are preferred. At least part of the gaseous effluent from chlorine-brine gas-liquid separator 107, containing chlorine, oxygen, water vapor, carbon dioxide and small amounts of other gases is cooled directly or indirectly against cooled or chilled water to condense out water vapor (in apparatus not shown), the cool gas being sent by conduit 209A to optional vessel 109 in which it is dried against a counter-current stream of concentrated sulfuric acid, preferably 66° Baume (about 98% acid). Preferably the relative flow rates of acid and chlorine are controlled so that the effluent acid has a concentration of about 73%. Vessel 109 preferably is packed with acid resistant packing. The dried chlorine passes through conduit 210 to optional chlorine compressor 110 in which the partial pressure of chlorine is raised substantially above its boiling point at the temperature of the available cooling water or chilled water. The compressed chlorine passes through conduit 211 to chlorine cooler-liquifier 111 in which a substantial fraction of the chlorine condenses indirectly against cooling water or chilled water. As chlorine condenses the concentration of oxygen, carbon dioxide, water vapor and other gases increases in the remaining gas phase and the partial pressure of chlorine decreases. The pressure generated by the compressor 110 is therefore controlled to leave in the gas phase in liquidifier 111 that chlorine which when combined with hydrogen will give at least the hydrochloric acid required for internal uses in the system. The liquid chlorine is taken as product from conduit C. The gas phase from vessel 111 passes through conduit 212A to chlorine-hydrogen burner 112 (described above) in which it combines with a substantially equivalent amount of hydrogen from caustic-hydrogen gas-liquid separator 114 by means of conduit 212B and with water to produce hydrochloric acid solution. The hydrochloric acid solution passes through conduit 213 to storage in vessel 113. Internal uses are withdrawn through conduits 203C, 204B, 206D and 208C, the remainder being withdrawn as a product of the system through conduit D.

The operation and concept of the invention will be further understood from the following examples.

EXAMPLE 1

This example illustrates a preferred operation in accordance with the invention. A system is assembled in accordance with FIG. 1. Five electrolytic cells are used, each containing a poly perfluorocarbon based cation permselective membrane having sulfonic acid active groups and reinforced with a loosely woven poly perfluoro carbon fabric manufactured by the duPont Co. under the trademane Teflon ®. The membrane has a hyperselective skin having less than about 200 grams of water per gram equivalent of active group. The skin is oriented toward the cathode compartment. Each membrane is in contact with an expanded steel cathode which is deeply etched and lightly nickel plated on one surface before expansion to give a low overpotential surface. The cathode apertures have a characteristic dimension in the range of 1 to 2 millimeters and are about 0.25 millimeters thick. The etched and nickel plated surface is on the side of the cathode away from the membrane. The void volume of the cathode is greater than 50%. The cathode is supported against the membrane by a nickel plated woven steel screen precathode having strands about every 7 millimeters. The precathode also collects the electric current. There is a gas-liquid space behind the precathode (that is on the side opposite the membrane) of about 10 millimeters. The anode in each cell consists of expanded commerically pure titanium sheet having a thickness of about 0.5 millimeters. The characteristics dimension of the openings is greater than 2 millimeters. The anode is positioned about 2 millimeters from the membrane and has a high surface area coating prepared by painting on a viscous aqueous slurry of finely ground ruthenium oxide and baking. The painting and baking procedure is repeated ten times to give a 10 layer coating. The surface of the titanium is prepared by deep etching and scrubbing with emery paper and water. The ruthenium oxide surface is on the side of the anode away from the membrane. The electrically active area of each cell is about 1 square decimeter. There is a gas-liquid space behind the anode of about 10 millimeters.

Solar salt is used having a composition on a dry basis approximately as follows:

|  | Range |
|---|---|
| Insolubles | 0.5 to 2% |
| Calcium | 0.1 to 0.5% |
| Magnesium | 0.05 to 0.4% |
| Sulfate | 0.3 to 2.0% |
| Chloride | 58.0 to 59.2% |

Tap water is saturated with said salt by allowing the water to percolate through a column of the salt. Included with the tap water is recycled brine obtained as described below. The impure brine thus prepared is analyzed for calcium and for magnesium. Substantially more than the stoichiometric amount of concentrated phosphoric acid, calculated on the calcium content, is added to the impure brine with stirring and the pH is adjusted to more than about 10 preferably about 11 with some of the liquid product from the catholyte compartments of the electrolytic cells. The stirring is continued for about 2 hours and then stopped. The brine is allowed to settle for several hours, then decanted and filtered through a diatomaceous earth precoat filter. Part of the brine is passed through a column of Amberlite IRC 718 (sold by the Rohm and Haas Co.) in the sodium form at a rate in the range of 0.1 to 0.3 liters of brine per minute per liter of resin. The effluent brine is analyzed and found to contain less than about 2 parts per million of any non-monovalent metallic cation.

Similar results are obtained when the phosphoric acid is replaced with stoichiometric or substantially more than the stoichiometric amounts of sodium carbonate, sodium bicarbonate, sodium ortho phosphate or sodium acid phosphate or when the Amberlite IRC 718 is replaced with four mixer-settler stages or liquid ion exchange using purified kerosene containing about 5 percent of diethyl hexyl phosphoric acid and about 2.5 percent of tributyl phosphate. After the final separation from the liquid chelating cation exchanger, the brine is passed through a column of activated carbon to remove residual organics. The brine effluent from the chelating cation exchangers is monitored and the cation exchangers are judged to be exhausted for purposes of this invention when the concentration of any non-monovalent metallic cation in the effluent exceeds about 2 parts per million. The exchangers are regenerated with 4 to 10 percent hydrochloric acid prepared by burning some of the gas effluent from the cathode compartments with a substantially equal volume of gas from the anode compartments. The spent regeneration acid is saved and used to assist in adjusting the pH of the liquid effluent from the anode compartments prior to stripping with air as described below. The cation exchangers are put in the sodium form by contacting with some of the liquid effluent from the cathode compartments. The excess is added to the cathode compartments during the first part of the operation and to the brine treatment step during the latter part.

Tap water is passed through a cation exchange resin in the sodium form. A suitable resin is Dowex 50, supplied by Dow Chemical Co. The water is added to the cathode compartments at a rate to produce an effluent having a concentration in excess of about 8 percent sodium hydroxide by weight. The cation exchanger is judged to be exhausted when the concentration of any non-monovalent cation in the effluent exceeds about 20 parts per million. It is regenerated by contacting with part of the filtered brine prepared as described above. The spent brine is saved and recycled to the brine treatment step.

The flow of brine through the anolyte is adjusted so that not more than about 60 percent of the chloride input is used for production of chlorine and by-products. The pH of the brine effluent from the anode compartments is measured and held in the range of from about 2 to about 4 by adding to the brine influent to the anode compartments some of the hydrochloric acid produced by combining hydrogen from the cathode compartments with chlorine from the anode compartments. The temperature of the liquid effluent from the cathode compartments is controlled in the range of from about 70° C. to about 95° C. by recirculating at least part of the catholyte through a heat exchanger cooled with water or heated with steam as required. The pressure of the chlorine gas in the anode compartments is maintained at several inches of water head more than the pressure of hydrogen in the cathode compartments by adjusting the height of the liquid levels in the respective gas-liquid separators. The current density is varied within the range of from about 15 to about 35 amperes per square decimeter.

The effluent from the cathode compartments passes to a gas-liquid separator from which part of the liquid is recycled through a heat exchanger to the cathode compartments to control the temperture of the effluent liquid therefrom. The remainder of the liquid passes to a storage containter from which portions are taken for brine pretreatment, chelating cation exchanger regeneration and absorption of dilute chloride gas from the dechlorinator. Part of the remainder is used to absorb the chlorine not sent to the hydrogen chlorine burner described below. The hydrogen from the gas-liquid separator is combined with chlorine as described below.

The effluent from the anode compartments passes to a second gas-liquid separator. The liquid phase is separated and hydrochloric acid, (produced as described below) is added plus the spent regeneration acid from the chelating cation exchanger to adjust the pH to less than about 2. The acidified spent brine is passes down a packed column having acid resistant ceramic packing against a stream of air at least equal in volumetric flow rate to the spent brine. The chlorine laden air is bubbled through an excess of sodium hydroxide obtained from the cathode compartments. The temperature of the caustic is maintained at less than about 30° C. and a solution containing hypochlorite is produced. The effluent from the dechlorination tower is analyzed for chlorate and sulfate and part sent to waste, that part being controlled so that when the remainder is resaturated with solar salt and added to fresh brine (prepared from tap water) the chlorate and sulfate contents of the combined brine will each be less than about 25 grams per liter.

Part of the chlorine from the anode compartment gas-liquid separator is sent to a water cooled graphite nozzle where it is burned with an equal volume of hydrogen from the cathode compartment gas-liquid separator. The products of combustion are cooled in a water cooled Hastelloy C heat exchanger packed on the gas side with ceramic packing. A controlled flow of water trickles down the packing and is controlled to produce concentrated hydrochloric acid in the effluent. Residual gas from the top of the absorber is diluted with a large volume of air sent to waste. The hydrochloric acid is stored for the internal uses discussed above. The remaining hydrogen (not converted to hydrochloric acid) is diluted with air below the lower explosion limit and sent to waste. The remaining chlorine is absorbed in an excess of the caustic stored as described above.

It will be understood that during the first start up of the above described system it is necessary to use exogenous caustic and hydrochloric acid for the internal uses discussed. However during steady state operation and subsequent start-ups, acid and caustic derived from the system are used.

The amount of chlorine produced and the electrical energy consumed are measured. The operating parameters of the cells are varied. It is found that the chlorine evolution efficiency is highest and the electrical energy consumption per unit of chlorine is lowest when the effluent from the cathode compartments has a temperature of at least 70° C. and preferably not more than about 95° C. and a concentration of caustic in excess of about 8 percent by weight; the effluent from the anode compartments has a salt utilization of not more than about 60 percent of salt feed and a pH in the range of about 2 to about 4; the concentration of sulfate and chlorate in the brine feed are each less than about 25 grams per liter; and the concentration of any non-monovalent metallic cation in the brine feed is maintained at a concentration of not more than about 2 parts per million. It is found that when operating outside these preferred ranges the chlorine evolution efficiency is substantially reduced and the electrical energy consumption per unit of chlorine substantially increased.

EXAMPLE 2

The system of Example 1 is assembled and operated as described except the poly per fluorocarbon membranes contain sulfonamide active groups in the hyperselective skins. The water content of the skins is less than about 200 grams per gram equivalent of active groups. The membranes are reinforced with Teflon ® fabric. The finely textured cathodes and the precathodes are replaced with a nickel plated expanded steel cathode having more than 50 percent voids, the voids having a characteristic dimension of more than about 2 millimeters. The cathodes are moved to position about 2 millimeters away from the membranes. The current density is varied over the range of from about 15 to about 35 amperes per square decimeter. The flow of water to the cathodes is controlled to produce a liquid effluent from the cathode compartments having a concentration in the range of from about 6 percent to about 35 percent. The temperature of the liquid effluent from the cathode compartments is controlled in the range of from about 70° C. to about 95° C. by recirculating part of the effluent through a heat exchanger. Cooling of the heat exchanger is provided by the vacuum flash evaporation of the remainder of the effluent, the product. The other operating parameters are the same as in Example 1. The amount of chlorine produced and the electrical energy consumed are measured. It is found that the chlorine evaluation efficiency is highest, the electrical energy consumption per unit of chlorine is lowest and the operation of the membrane cells most stable when the effluent from the cathode compartments has a temperature of at least 70° C. and preferably not more than about 95° C. and a concentration of caustic in the range of from about 8 to about 30 percent by weight; the effluent from the anode compartments has a salt utilization of not more than about 60 percent of salt feed and a pH in the range of from 2 to about 4; the concentration of sulfate and chlorate in the brine feed are each less than about 25 grams per liter; and the concentration of any non-monovalent metallic cation in the brine feed is maintained at a concentration of not more than about 2 parts per million. It is found that when operating outside these preferred ranges, the chlorine evolution efficiency is substantially reduced, the electrical energy consumption per unit of chlorine is substantially increased and the operation of the electrolytic cells is substantially less stable.

EXAMPLE 3

The membrane of Example 1 is used in the system of Example 2. The solar salt is replaced with technical grade potassium chloride. The precipitation agent is potassium carbonate. The chelating cation exchanger is in the potassium form. The cation exchanger water softener is replaced with a mixed bed ion exchange deionizer. The system is operated as described in Example 1 except:

(a) After the addition of potassium carbonate and cathode compartment liquid effluent to the brine precipitation step, barium chloride is added in an amount chemically equivalent to the sulfate content.

(b) To control chlorate, part of the brine which has passed through the chelating cation exchanger is acidified to a pH of about 1, heated to about 95° C. and passed countercurrently down a column having acid resistant packing against a stream of air flowing at at least the same volumetric flow rate. The effluent air is contacted with an excess of liquid effluent from the cathode compartments maintained at a temperature of not more than about 30° C. to produce a solution containing hypochlorite. The chlorine containing air from the dechlorinator passes into the same contactor. The liquid effluent from the column is analyzed for chlorate and added to the remainder of the brine as feed to the anode compartments. The volume of brine processed in this way is controlled to give an anode compartment feed having a chlorate concentration of less than about 25 grams per liter.

(c) When the deionizer is exhausted, the cation exchange resin is separated from the anion exchange resin in the conventional way. The cation exchange resin is regenerated with hydrochloric acid generated in the system, the spent acid being added to the dechlorinator. The sodium ions in the spent acid are judged to be insignificant in comparison with the overwhelming concentration of potassium ions. The anion exchanger is regenerated with caustic potash generated in the system, the spent regenerant being added to the brine precipitation step. The resins are washed with deionized water and the mixed bed reassembled.

(d) The chlorine gas effluent from the anode compartment gas-liquid separator is cooled in a glass heat exchanger indirectly against chilled water having a temperature of about 9° C. and the condensed water separated from the gas. The gas is dried in a packed tower by direct contact with a countercurrent stream of 98% sulfuric acid. The flow of acid is controlled so that the effluent acid has a concentration of not less than about 73% by analysis. The gas effluent from the drier passes to a pyrex receiver cooled with a mixture of dry ice and acetone in which a major fraction of the chlorine liquefies. The remaining gas is found to contain chlorine and oxygen and probably other gases. It is warmed to room temperature and burned with a substantially equivalent amount of hydrogen as described in Example 1 to produce the hydrochloric acid recycled in the system.

The foregoing disclosure is intended to be illustrative of representative and preferred forms of the present invention. In the claims appended hereto where elements of the method and apparatus are referred to generically, it is intended that such reference shall embrace the coresponding elements described in the disclosure and equivalents thereof. It is intended that the claims shall cover and embrace the invention both generically and specifically, the disclosure being illustrative and the invention to be accorded the full scope of the claims.

The embodiments of this invention in which an exclusive property or privilege is claimed are defined as follows:

1. A process wherein a substantially saturated aqueous alkali metal chloride brine, containing minor amounts of non-monovalent metallic cations, is electrolyzed in a multiplicity of membrane chlor-alkali cells having anode compartments containing anodes, said anodes capable of generating chlorine containing minor amounts of oxygen from aqueous chloride solution and a pH in the range of from about 0.5 to about 5, cathode compartments containing cathodes and substantially fluid impermeable, cation permselective perfluorocarbon membranes separating said anode compartments from said cathode compartments and wherein at least part of the gaseous chlorine effluent from said anode compartments is burned with a substantially chemically equivalent amount of the gaseous hydrogen effluent from said cathode compartments and thereafter absorbed in water to produce hydrochloric acid, which process comprises:

(a) as a first brine purification step, mixing said brine with at least one compound selected from the group consisting of phosphoric acid, alkali carbonates, alkali bicarbonates, alkali phosphates, alkali acid phosphates and mixtures thereof, adding a first portion of the alkali metal hydroxide liquid effluent from said cathode compartments to produce a pH of at least about 10 thereby precipitating a substantial portion of said non-monovalent cations, removing said precipitate and recovering the thus pretreated brine;

(b) as a subsequent brine purification step, contacting substantially all of the recovered brine of step (a) having a pH of at least about 9 with a chelating cation exchanger in the monovalent cation form thereby maintaining the concentration of any non-monovalent metallic cation in the brine effluent at a concentration of not more than about 2 parts per million;

(c) thereafter flowing said purified brine into said anode compartments and adding thereto a first portion of said hydrochloric acid so controlled as to maintain the pH of the liquid immediately effluent from said anode compartments in the range of from about 2 to about 4;

(d) maintaining the liquid effluent from said cathode compartments at a concentration of at least about 8 percent by weight of alkali metal hydroxide and at a temperature of at least about 70° C.;

(e) substantially regenerating said chelating exchanger with a second portion of said hydrochloric acid solution and thereafter contacting said exchanger with a second portion of the alkali metal hydroxide liquid effluent from said cathode compartment to substantially convert said exchanger to the alkali metal form;

(f) adjusting the pH of substantially all the liquid effluent from said anode compartments to a value less than or equal to about 2 by adding a third portion of such hydrochloric acid solution thereby substantially converting any hypochlorite therein to chlorine, thereafter removing and recovering dissolved chlorine in said liquid effluent to produce a low chlorine liquid effluent, and;

(g) substantially resaturating at least part of the resulting low chlorine liquid effluent of step (f) with alkali metal chloride and returning it to said first brine purification step.

2. The process of claim 1 wherein the dissolved chlorine of said liquid effluent is removed by intimately contacting said liquid effluent with at least one volume of air, thereby recovering chlorine in said air as chlorine containing air and thereafter contacting said chlorine-containing-air with a second portion of the liquid effluent from said cathode compartments in an amount at least equivalent to the chlorine in said air at a temperature of less than about 30° C. thereby producing an aqueous solution containing hypochlorite.

3. The process of claim 1 in which another part of said hydrochloric acid solution is reacted with part of the effluent from said chelating cation exchanger to convert a substantial fraction of any chlorate in said part of said effluent to chlorine, removing at least part of the chlorine, adding the thus treated part of said effluent to the remainder of said effluent to produce a combined effluent having a chlorate concentration of less than about 15 grams per liter and thereafter flowing said combined effluent into said anode compartment.

4. The process of claim 1 in which water sufficient to form an effluent from the cathode compartments having a concentration of at least 8 percent by weight of alkali metal hydroxide is fed to said cathode compartments and in which at least part of said water is first contacted with a cation exchanger in the monovalent cation form thereby substantially removing non-monovalent cations from said part of said water, thereafter substantially regenerating said cation exchanger by contacting it with a portion of said pretreated brine solution and returning at least part of the thus contacted brine to said first brine purification step.

5. The process of claim 1 in which the chelating cation exchanger comprises imino-dicarboxylic acid groups.

6. The process of claim 1 in which the chelating cation exchanger comprises diethyl hexyl phosphoric acid and tributyl phosphate dissolved in a substantially water insoluble hydrocarbon.

7. The process of claim 1 in which at least part of the chlorine effluent from said anode compartments is dried and compressed, a first portion of said dried, compressed chlorine is liquified by cooling it and a second portion is combined with a substantially equivalent amount of hydrogen effluent from said cathode compartments to produce said aqueous hydrochloric acid solution.

8. The process of claim 1 in which water sufficient to form an effluent from the cathode compartments having a concentration of at least 8 percent by weight of alkali metal hydroxide is fed to said cathode compartments and in which at least part of said water is first contacted with cation exchange resin in the hydrogen form and anion exchange resin in the hydroxide form thereby substantially demineralizing said part of said water, thereafter substantially regenerating said cation exchanger by contacting it with a portion of said hydrochloric acid solution and substantially regenerating said anion exchanger by contacting it with a portion of the said liquid effluent from said cathode compartments and in which at least part of the spent regenerate from the anion exchanger containing some free alkali is recycled to the first brine purification step.

9. Apparatus for producing chlorine comprising a multiplicity of cells having anode compartments containing anodes capable of generating chlorine containing minor amounts of oxygen from aqueous chloride solutions having at least one gram equivalent of free chloride per liter of solution and a pH in the range of about 0.5 to 5, cathode compartments containing cathodes and substantially fluid impermeable, cation permselective perfluorocarbon membranes separating said anode compartments from said cathode compartments which comprises:

(a) first pretreatment means for mixing a substantially saturated aqueous chloride solution containing minor amounts of non-monovalent metallic cations with at least one compound capable of forming an insoluble calcium compound, means for measuring the pH of the mixture and pH responsive means for controlling the addition of a first portion of the liquid effluent from said cathode compartments to said mixture;

(b) second pretreatment means for contacting said recovered solution with a chelating cation exchanger;

(c) means for maintaining the pH of the liquid, immediately effluent from said anode compartments in the range of from about 2 to about 4;

(d) means for maintaining the liquid effluent from said cathode compartments at a concentration of at least about 8 percent by weight of alkali metal hydroxide;

(e) means for maintaining the liquid, immediately effluent from said cathode compartments, at a temperature of at least about 70° C.;

(f) means for combining at least part of the hydrogen effluent from said cathode compartments with a substantially equivalent amount of chlorine effluent from said anode compartments and with water; to produce aqueous hydrochloric acid;

(g) means for substantially regenerating said chelating cation exchanger with a first part of said aqueous hydrochloric acid solution;

(h) means for subsequently converting said exchanger substantially to the alkali metal form by contacting with a second portion of the liquid effluent from said cathode compartments;

(i) means for measuring the pH of the liquid effluent from said anode compartments, means for adding a second part of said hydrochloric acid solution to said effluent, said means being responsive to said pH measuring means, means for removing the dissolved chlorine from said liquid effluent, means for recovering said chlorine and said liquid effluent and;

(j) means for substantially resaturating at least part of said recovered anode effluent with chloride and returning it to said pretreatment means.

10. The apparatus of claim 9 wherein dissolved chlorine in said anode liquid effluent is removed by means for intimately contacting said effluent with air with means thereafter for recovering said air and contacting the same with a second portion of the liquid effluent from said cathode compartment including means for maintaining said second portion at a temperature of less than about 30° C.

* * * * *